US010651662B2

(12) United States Patent
Lee et al.

(10) Patent No.: US 10,651,662 B2
(45) Date of Patent: May 12, 2020

(54) OVERCHARGE PROTECTION DEVICE AND METHOD INCLUDING DIAGNOSTIC FUNCTION

(71) Applicant: SK INNOVATION CO., LTD., Seoul (KR)

(72) Inventors: Yun Nyoung Lee, Gyeonggi-do (KR); Dong Hun Lim, Gyeonggi-do (KR)

(73) Assignee: SK INNOVATION CO., LTD., Seoul (KR)

(*) Notice: Subject to any disclaimer, the term of this patent is extended or adjusted under 35 U.S.C. 154(b) by 185 days.

(21) Appl. No.: 14/870,857

(22) Filed: Sep. 30, 2015

(65) Prior Publication Data
US 2016/0099591 A1    Apr. 7, 2016

(30) Foreign Application Priority Data

Oct. 2, 2014 (KR) .................. 10-2014-0133263

(51) Int. Cl.
H02J 7/00    (2006.01)

(52) U.S. Cl.
CPC ............ *H02J 7/0031* (2013.01); *H02J 7/007* (2013.01); *H02J 7/0026* (2013.01); *H02J 7/00302* (2020.01)

(58) Field of Classification Search
CPC .. H02J 7/0031; H02J 7/007; H02J 7/00; H02J 2007/0037

(Continued)

(56) References Cited

U.S. PATENT DOCUMENTS 2,170,748 A * 8/1939 Eaton ................ H01H 13/36
                                              200/404
2,402,695 A * 6/1946 Taylor .............. H02J 7/0031
                                              320/154

(Continued)

FOREIGN PATENT DOCUMENTS

EP    2 645 527    10/2013
EP    2 696 502    2/2014

(Continued)

OTHER PUBLICATIONS

The extended European search report issued by the European Patent Office dated Jan. 13, 2016.
Office Action issued by Korean Patent Office on Feb. 14, 2020.

*Primary Examiner* — Richard Isla
*Assistant Examiner* — Dung V Bui
(74) *Attorney, Agent, or Firm* — IP & T Group LLP

(57) ABSTRACT

Disclosed herein is an overcharge protection device including a diagnostic function. The overcharge protection device comprises: a mechanical overcharge protection device, connected between the relay actuation coil of a main relay and a ground, for disconnecting the connection between the relay actuation coil and the ground when the degree of swelling of a battery is equal to or greater than a predetermined value; and a control unit for diagnosing whether the mechanical overcharge protection device is operating or has failed by detecting the voltage between the two ends of the mechanical overcharge protection device. Accordingly, because whether the mechanical overcharge protection device is operating or has failed may be diagnosed accurately, it is possible to detect in advance that the mechanical overcharge protection device may not be operating normally (Continued)

due to the defects or failure thereof whereby a fail-safe overcharge protection device may be embodied and safety may be improved.

6 Claims, 3 Drawing Sheets

(58) Field of Classification Search
USPC .......................................................... 320/162
See application file for complete search history.

(56) References Cited

U.S. PATENT DOCUMENTS

| | | | | | |
|---|---|---|---|---|---|
| 2,700,709 | A | * | 1/1955 | Byam | H01H 61/063 200/294 |
| 2,842,718 | A | * | 7/1958 | Smith | H01H 83/02 335/256 |
| 2,991,413 | A | * | 7/1961 | Taylor | G01R 31/3646 324/435 |
| 3,495,200 | A | * | 2/1970 | Euler | H01H 50/34 335/194 |
| 3,950,745 | A | * | 4/1976 | Miller | G07C 5/0825 340/521 |
| 4,070,699 | A | * | 1/1978 | Einbinder | A61N 1/39 361/86 |
| 4,228,412 | A | * | 10/1980 | Dalley | H01H 50/04 335/112 |
| 4,536,695 | A | * | 8/1985 | Lin | H02J 7/0031 307/10.7 |
| 5,581,170 | A | * | 12/1996 | Mammano | H02J 7/0019 320/116 |
| 5,826,958 | A | * | 10/1998 | Avitan | H01M 10/44 320/136 |
| 6,346,670 | B1 | * | 2/2002 | Fujii | H02J 7/35 136/244 |
| 7,510,798 | B2 | * | 3/2009 | Masuda | H01M 2/345 429/121 |
| 7,688,023 | B2 | * | 3/2010 | Yoon | H01M 10/441 320/104 |
| 2006/0261677 | A1 | * | 11/2006 | Shibuya | H02J 7/0018 307/105 |
| 2007/0001799 | A1 | * | 1/2007 | Neumann | H01H 1/5805 337/66 |
| 2008/0111556 | A1 | | 5/2008 | Yano | |
| 2009/0015229 | A1 | * | 1/2009 | Kotikalapoodi | H02M 3/1582 323/285 |
| 2011/0050000 | A1 | * | 3/2011 | Park | H01M 4/42 307/116 |
| 2012/0200968 | A1 | * | 8/2012 | Altemose | H02J 7/0026 361/86 |
| 2012/0313573 | A1 | | 12/2012 | Lim et al. | |

FOREIGN PATENT DOCUMENTS

| | | |
|---|---|---|
| JP | 2007-033108 | 2/2007 |
| JP | 2010-140785 | 6/2010 |
| JP | 2010-146841 | 7/2010 |
| KR | 1020130083528 | 7/2013 |
| KR | 10-2014-0029800 A | 3/2014 |
| KR | 10-2014-0078910 A | 6/2014 |

* cited by examiner

ОVERCHARGE PROTECTION DEVICE AND METHOD INCLUDING DIAGNOSTIC FUNCTION

CROSS REFERENCE TO RELATED APPLICATION(S)

This application claims the benefit of Korean Patent Application No. 10-2014-0133263 filed on Oct. 2, 2014, entitled "OVERCHARGE PROTECTION APPARATUS AND METHOD INCLUDING DIAGNOSTIC FUNCTION", which is hereby incorporated by reference in its entirety into this application.

BACKGROUND OF THE INVENTION

1. Field of the Invention

The present invention relates to an overcharge protection device and method that include a diagnostic function.

2. Description of the Related Art

Generally, a lithium-ion battery, which is a rechargeable battery, may explode and ignite when it is overcharged. Also, a battery module usually includes multiple battery cells in order to provide the required output power. When any one of the battery cells included in the battery module is overcharged and thus explodes or ignites, it may affect not only the overcharged battery cell but also the other battery cells. Therefore, it is essential to prevent the battery from being overcharged in order to secure the safety of the battery.

Generally, overcharge protection devices may be categorized into electrical overcharge protection devices and mechanical overcharge protection devices.

An electrical overcharge protection device continuously monitors the voltage of a battery cell by being connected to one of the cells included in a battery module. When the battery cell is overcharged and the voltage of the battery cell exceeds a certain voltage, the electrical overcharge protection device opens the switch of a main relay by interrupting the supply of voltage applied to the actuation coil of the main relay, whereby the electrical connection between the battery module and the charging power source or load is disconnected.

The mechanical overcharge protection device continuously monitors whether a battery cell abnormally swells by being connected to one of the cells included in a battery module. When the battery cell is overcharged and the internal pressure thereof increases, the battery cell swells. In this case, the swelling of the battery cell causes the mechanical overcharge protection device to open the switch of a main relay by opening a closed circuit that includes the actuation coil of the main relay, whereby the electrical connection between the battery module and the charging power source or load is disconnected.

However, because a conventional mechanical overcharge protection device does not include a diagnostic function for the overcharge protection device itself, it may not determine whether the mechanical overcharge protection device is in a normal state or in a nonfunctioning Ss state, and may not check whether the overcharge protection operation, which actually disconnects the electrical connection between the battery module and the charging power source or load, has been performed appropriately in response to the abnormal swelling of the battery cell.

When the contact points of the mechanical overcharge protection device have worn down due to vibration or the like, the mechanical overcharge protection device may not operate normally due to failure of the contacts. Accordingly, even if the battery is overcharged and swells, the conventional mechanical overcharge protection device may not detect this, and the battery may explode or ignite.

A patent application mentioned below in the documents of the related art relates to a failure diagnosis circuit capable of diagnosing the failure of a switchgear unit installed in the charging and discharging path of a secondary battery while reducing the increase of discharge current of the secondary battery, and a battery pack including this failure diagnosis circuit. However, the patent application mentioned in the following documents of the related art may not diagnose the operating state and the failure of a mechanical overcharge protection device.

Therefore, required is an overcharge protection device and, method that can diagnose the operating state and the failure of a mechanical overcharge protection device.

DOCUMENTS OF RELATED ART (Patent Document 1) JP201-140785 A

SUMMARY OF THE INVENTION

Accordingly, an object of the present invention is to provide an overcharge protection device including a diagnostic function, which may ensure that the mechanical overcharge protection device is fail-safe by detecting in advance whether the mechanical overcharge protection device is operating and by detecting a defect or the failure thereof.

Another object of the present invention is to provide an overcharge protection method including a diagnostic function, which may ensure that the mechanical overcharge protection device is fail-safe by detecting in advance whether the mechanical overcharge protection device is operating and by detecting a defect or the failure thereof.

In order to achieve the above object an overcharge protection device including a diagnostic function, according to an embodiment of the present invention, includes: a mechanical overcharge protection device, connected between a relay actuation coil of a main relay and a ground, for interrupting a connection between the relay actuation coil and the ground when a degree of swelling of a battery is equal to or greater than a predetermined value; and a control unit for diagnosing whether the mechanical overcharge protection device is operating or has failed by detecting a voltage between two ends of the mechanical overcharge protection device.

In the overcharge protection device including a diagnostic function, according to an embodiment of the present invention, the mechanical overcharge protection device may include at least one runaway arresting device (RAD) switch that is shorted when the degree of the swelling of the battery is less than the predetermined value and is open, when the degree of the swelling of the battery is equal to or greater than the predetermined value.

Also, in the overcharge protection device including a diagnostic function, according to an embodiment of the present invention, the control unit may determine that an overcharge protection operation has been normally performed by the mechanical overcharge protection device when the voltage between the two ends of the mechanical overcharge protection device is 0 volts, may determine that the mechanical overcharge protection device is in a normal state and has not operated when the voltage between the two ends of the mechanical overcharge protection device is greater than 0 volts and less than a reference value, and may determine that the mechanical overcharge protection device has defects or is in a failed state when the voltage between the two ends of the mechanical overcharge protection device is equal to or greater than the reference value.

Also, in the overcharge protection device including a diagnostic function, according to an embodiment of the present invention, when the voltage between the two ends of the mechanical overcharge protection device is equal to or greater than the reference value, the control unit may open a switch of the main relay by interrupting a supply of voltage applied to the relay actuation coil of the main relay.

Also, in the overcharge protection device including a diagnostic function, according to an embodiment of the present invention, the reference value may be 3 volts.

In order to achieve the above object, an overcharge protection method including a diagnostic function, according to an embodiment of the present invention, includes: detecting, by a control unit, a voltage between two ends of a mechanical overcharge protection device; and diagnosing, by the control unit, whether the mechanical overcharge protection device is operating or has failed, based on the detected voltage between the two ends of the mechanical overcharge protection device.

In the overcharge protection method including a diagnostic function, according to an embodiment of the present invention, the mechanical overcharge protection device includes at least one runaway arresting device (RAD) switch that is shorted when a degree of swelling of a battery is less than: a predetermined value and is open when the degree of the swelling of the battery is equal to or greater than the predetermined value.

Also, in the overcharge protection method including a diagnostic function, according to an embodiment of the present invention, the step for diagnosing whether the mechanical overcharge protection device is operating or has failed may include: determining that an overcharge protection operation has been normally performed by the mechanical overcharge protection device when the voltage between the two ends of the mechanical overcharge protection device is 0 volts; determining that the mechanical overcharge protection device is in a normal state and has not operated when the voltage between the two ends of the mechanical overcharge protection device is greater than 0 volts and less than a reference value; and determining that the mechanical overcharge protection device has defects or is in a ailed state when the voltage between the two ends of the mechanical overcharge protection device is equal to or greater than the reference value.

Also, the overcharge protection method including a diagnostic function, according to an embodiment of the present invention, may further include opening, by the control unit, a switch of a main relay by interrupting a supply of voltage applied to a relay actuation coil of the main relay when the voltage between the two ends of the mechanical overcharge protection device is equal to or greater than the reference value.

Also, in the overcharge protection method including a diagnostic function, according to an embodiment of the present invention, the reference value may be 3 volts.

The features and advantages of the present invention will be more clearly understood from the following detailed description when taken in conjunction with the accompanying drawings.

All terms or words used in the specification and claims have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present invention, because whether a mechanical overcharge protection device is operating or has failed may be accurately diagnosed, it is possible to detect in advance the case where the overcharge protection device is not operating normally due to the defects or failure thereof. Also, because a fail-safe overcharge protection device may be realized, safety may be improved.

DESCRIPTION OF THE PREFERRED EMBODIMENTS

Figure 1:
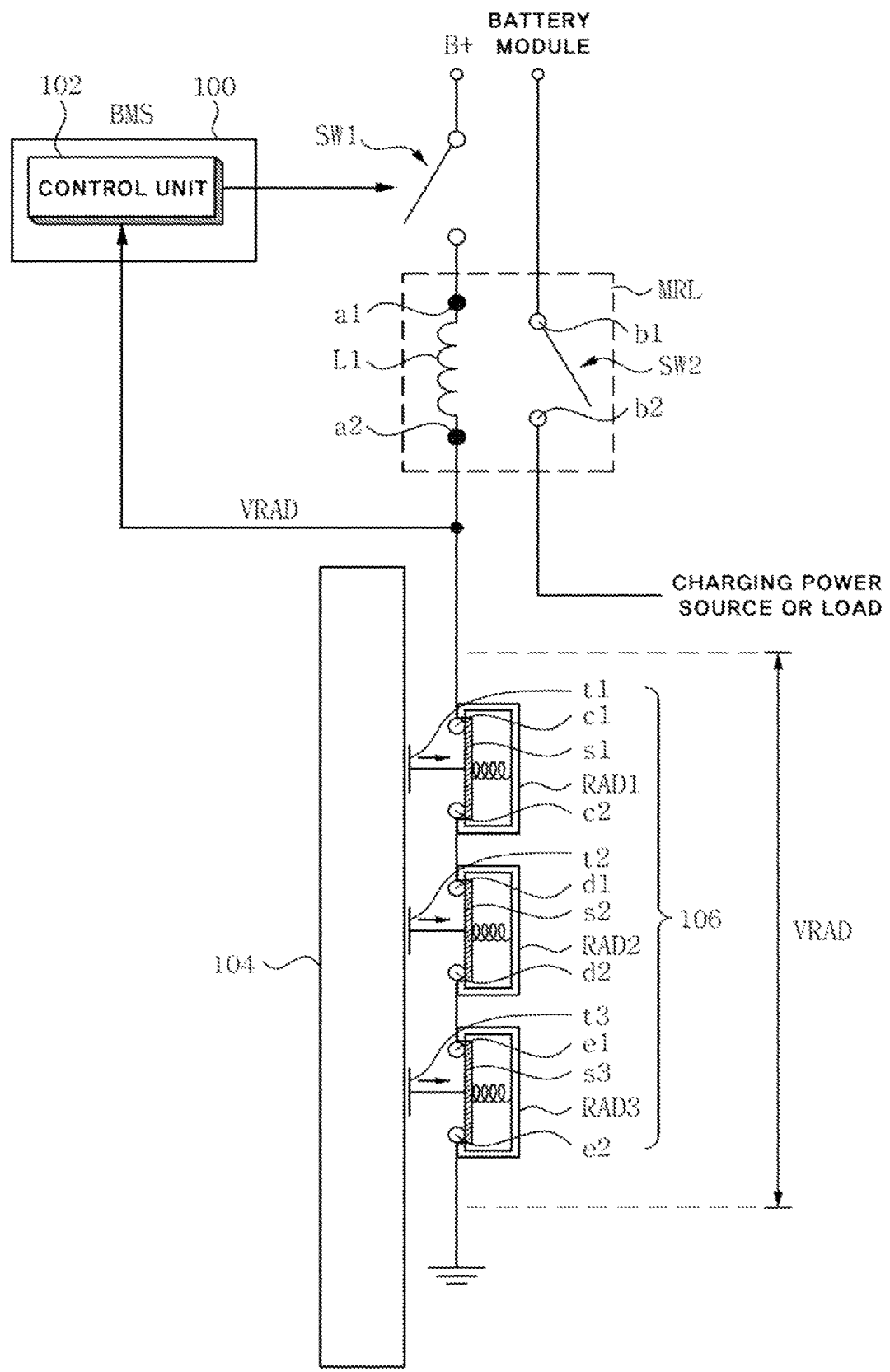
FIG. 1 illustrates an overcharge protection device including a diagnostic function according to an embodiment of the present invention.

The above and other objects, features and other advantages of the present invention will be more clearly understood from the following detailed description and preferred embodiments when taken in conjunction with the accompanying drawings.

As for the reference numerals associated with parts in the drawings, the same reference numerals will refer to the same or like parts throughout the drawings.

It will be understood that, although the terms "one side," "the other side," "first," "second," etc. may be used herein to describe various elements, these elements should not be limited by these terms. These terms are only used to distinguish one element from another element.

Hereinbelow, in the description, details of well-known features and techniques may be omitted to avoid unnecessarily obscuring the presented embodiments.

Hereinbelow, exemplary embodiments of the present invention will be described in detail with reference to the accompanying drawings.

FIG. 1 illustrates an overcharge protection device including a diagnostic function according to an embodiment of the present invention.

The overcharge protection device including a diagnostic function according to an embodiment of the present invention, illustrated in FIG. 1, comprises: a mechanical overcharge protection device 106, which is connected between the relay actuation coil L1 of a main relay MRL and a ground, and which disconnects the connection between the relay actuation coil L1 and the ground when the degree of swelling of a battery 104 is equal to or greater than a predetermined value; and a control unit 102 for determining whether the mechanical overcharge protection device 106 is operating or has failed by detecting a voltage VRAD between the two ends of the mechanical overcharge protection device 106.

In the embodiment of the present invention, the control unit 102 is included in a battery management system 100, but the embodiment of the present invention is not limited to this, and a separate control unit may be used.

In FIG. 1, a relay actuation switch SW1 is a switch for controlling the opening or shorting of the relay switch SW2 of the main relay MRL by supplying or not supplying voltage B+ to the contact point a1 of the relay actuation coil L1 by being shorted or open according to the control signal of the control unit 102.

In the embodiment of the present invention, the mechanical overcharge protection device 106 includes three Runaway Arresting Device (RAD) switches, namely, RAD1, RAD2, and RAD3, which are connected in series. The runaway arresting device switches, RAD1, RAD2, and RAD3 are shorted by the electrically connected contact points when the degree of swelling of the battery 104 is less than the predetermined value, and are open by the electrically disconnected contact points when the degree of swelling of the battery 104 is equal to or greater than the predetermined value.

In the embodiment of the present invention, the failure of the mechanical overcharge protection device 106 means the state in which the mechanical overcharge protection device may not normally perform an overcharge protection operation due to the abrasion of the contact points or defects of the three series-connected runaway arresting device switches RAD1, RAD2, and RAD3 included in the mechanical overcharge protection device 106.

The operation of an overcharge protection device including a diagnostic function according to an embodiment of the present invention, configured as the above description, will be described.

When a battery 104 is in a normal state, it is assumed that a relay actuation switch SW1 is shorted.

First, a control unit 102 detects the voltage VRAD between the two ends of the s mechanical overcharge protection device.

In the runaway arresting device switches RAD1, RAD2, and RAD3, at first, travelling contacts s1, s2, and s3 are connected to corresponding stationary contacts c1 and c2, d1 and d2, and e1 and e2, respectively. Also, the travelling contacts s1, s2, and s3 move depending on the moving direction of corresponding push buttons t1, t2, and t3.

The push buttons t1, t2, and t3 move in the direction of the arrow when the battery 104 swells due to an abnormal state such as an overcharged state.

When the battery 104 swells by being overcharged and the degree of swelling is equal to or greater than a predetermined value, the push buttons t1, t2, and t3 of the runaway arresting device switches RAD1, RAD2, and RAD3, arranged near the battery 104, move in the direction of the arrow, whereby the connections between the travelling contacts s1, s2, and s3 and the corresponding stationary contacts c1 and c2, d1 and d2, and e1 and e2 are disconnected.

When the connections between the travelling contacts s1, s2, and s3 and the corresponding stationary contacts c1 and c2, d1 and d2, and e1 and e2 are disconnected, the connection between the relay actuation coil L1 and a ground is disconnected and the relay switch SW2 of a main relay MRL is opened. As a result, the electrical connection between a battery module and a charging power source or load is disconnected, whereby the battery module is prevented from being overcharged.

Meanwhile, when the voltage VRAD between the two ends of the mechanical overcharge protection de vice 106 is 0 volts, the control unit 102 determines that the mechanical overcharge protection device 106 has performed the overcharge protection operation normally.

When the battery 104 abnormally swells and the degree of swelling is equal to or greater than a predetermined value, the connections between the travelling contacts s1, s2, and s3 and the corresponding stationary contacts c1 and c2, d1 and d2, and e1 and e2 are interrupted as the push buttons t1, t2, and t3 of the runaway arresting device switches RAD1, RAD2, and RAD3 in the mechanical overcharge protection device 106 are moved in the direction of the arrow. As a result, the voltage VRAD between the two ends of the mechanical overcharge protection device 106 becomes 0 volts.

Therefore, if the voltage VRAD between the two ends of the mechanical overcharge protection device 106 is 0 volts, the control unit 102 determines that that the mechanical overcharge protection device 106 detected the swelling of the battery 104 normally and the overcharge protection operation has been normally performed by the mechanical overcharge protection device.

When the voltage VRAD between the two ends of the mechanical overcharge protection device 106 is greater than 0 volts and less than a predetermined reference value, for example, 3 volts, the control unit 102 determines that the mechanical overcharge protection device is in a normal state and the overcharge protection operation has not been performed.

When the travelling contacts s1, s2, and s3 of the runaway arresting device switches RAD1, RAD2, and RAD3 are electrically connected to the corresponding stationary contacts c1 and c2, d1 and d2, and e1 and e2, the runaway arresting device switches RAD1, RAD2, and RAD3 respectively have very low resistance values, for example, 50 mΩ. Therefore, when the mechanical overcharge protection device 106 is in a normal state and the overcharge protection operation is not performed, the voltage VRAD between the two ends of the mechanical overcharge protection device 106 is greater than 0 volts and less than the predetermined reference value, 3 volts.

Accordingly, when the voltage VRAD between the two ends of the mechanical overcharge protection device 106 is greater than 0 volts and less than 3 volts, the control unit 102 determines that the mechanical overcharge protection device 106 is in a normal state and the overcharge protection operation is not performed.

When the voltage VRAD between the two ends of the mechanical overcharge protection device 106 is equal to or greater than 3 volts, the control unit 102 determines that the mechanical overcharge protection device 106 has defects or has failed.

As mentioned above, when the travelling contacts s1, s2, and s3 of the runaway arresting device switches RAD1, RAD2, and RAD3 are connected to the corresponding stationary contacts c1 and c2, d1 and d2, and e1 and e2, the runaway arresting device switches RAD1, RAD2, and RAD3 have very low resistance values.

However, when the runaway arresting device switches RAD1, RAD2, and RAD3 have defects, or when the travelling contacts s1, s2, and s3 of the runaway arresting device switches RAD1, RAD2, and RAD3, and the corresponding stationary contacts c1 and c2, d1 and d2, and e1 and e2 are worn down due to vibrations, the contact resistance between the travelling contacts s1, s2, and s3 and the corresponding stationary contacts c1 and c2, d1 and d2, and e1 and e2 becomes large, and thus the voltage between the two ends of the mechanical overcharge protection device 106 is equal to or greater than 3 volts.

Therefore, when the voltage between the two ends of the mechanical overcharge protection device 106 is equal to or greater than 3 volts, the control unit 102 determines that the mechanical overcharge protection device 106 has defects or is in a failed state.

Meanwhile, for stabilization of the system, when the voltage between the two ends of the mechanical overcharge protection device 106 is equal to or greater than 3 volts, the control unit 102 interrupts the supply of voltage B+ applied to the actuation coil L1 of the main relay MRL by controlling the operation of a relay actuation switch SW1, whereby the control unit 102 may open the switch SW2 of the main relay MRL.

In an embodiment of the present invention, the predetermined reference value is 3 volts, but the reference value may be changed depending on the number of runaway arresting device switches RAD1, RAD2, and RAD3 that are used.

Also, in the embodiment of the present invention, the battery 104 includes battery cells included in a battery module, but the embodiment of the present invention is not limited to this.

Figure 2:
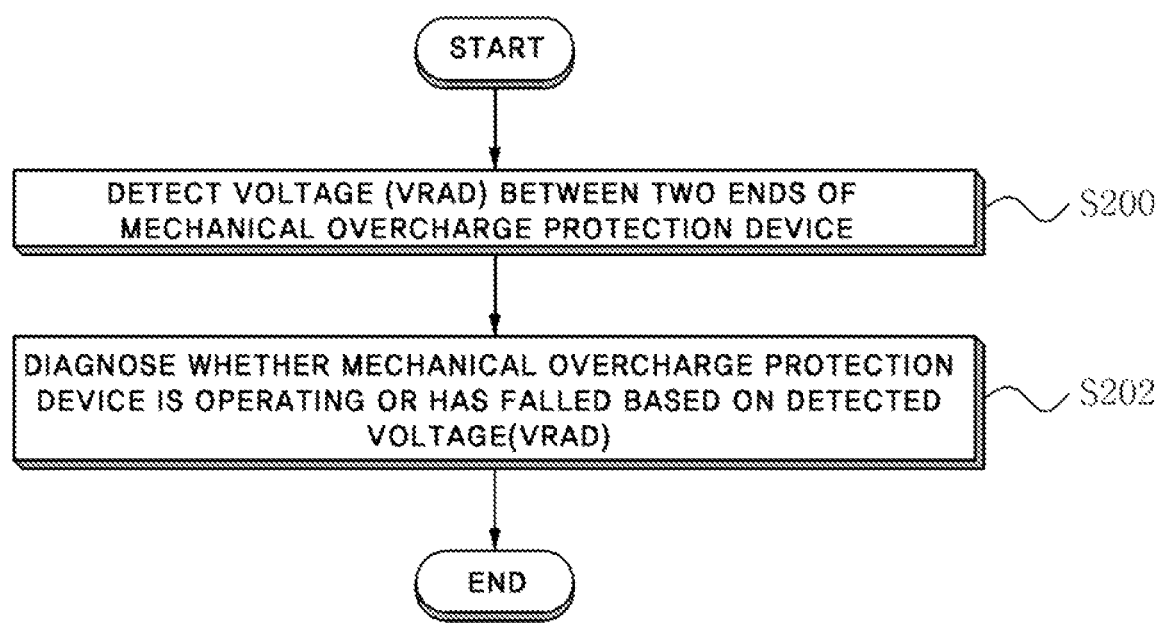
FIG. 2 is a flowchart illustrating an overcharge protection method including a diagnostic function according to an embodiment of the present invention.
Figure 3:
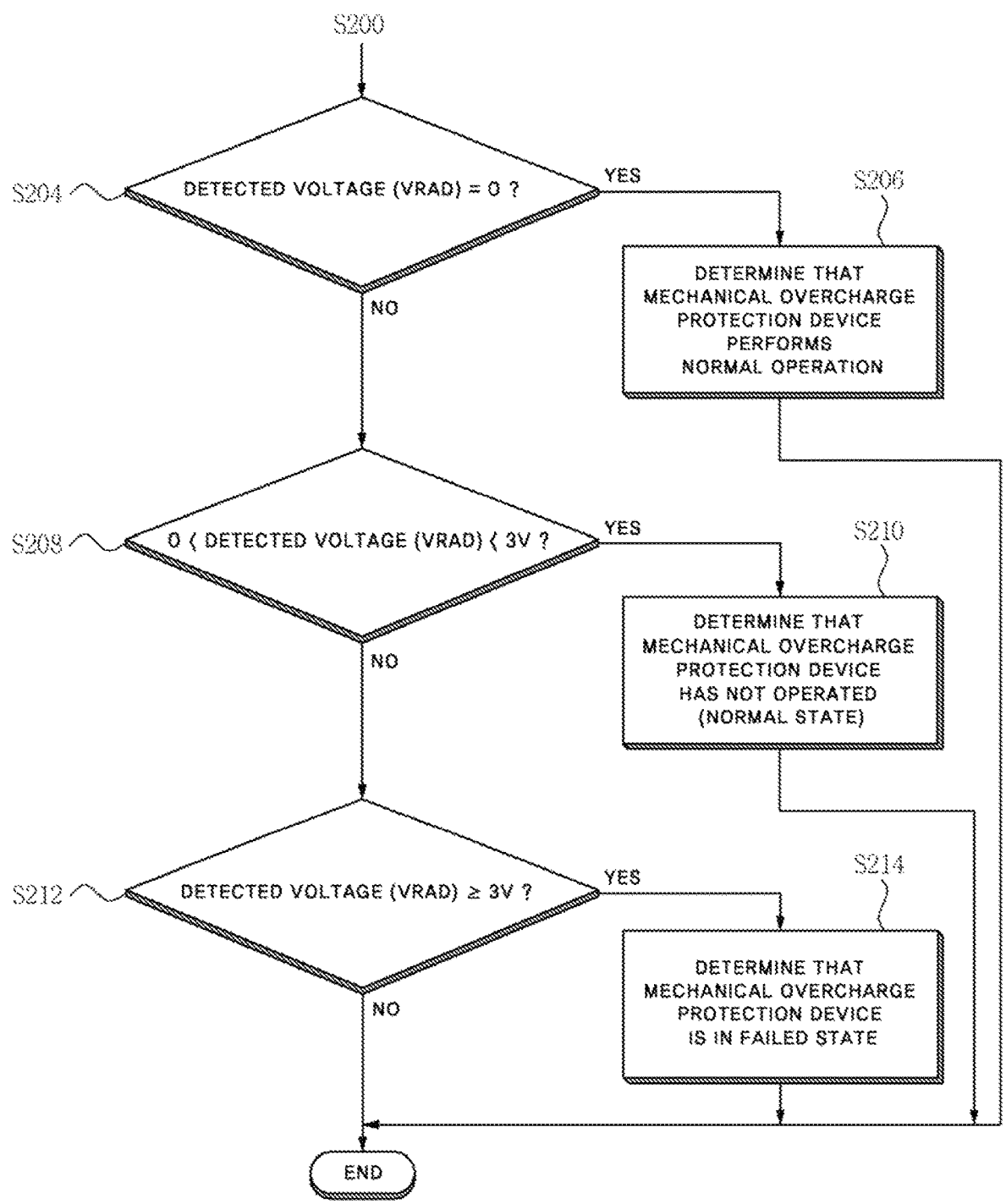
FIG. 3 is a detailed flowchart for the step illustrated in FIG. 2, in which whether an overcharge protection device is operating normally or has failed is determined.

FIG. 2 is a flowchart illustrating an overcharge protection method including a diagnostic function according to an embodiment of the present invention, and FIG. 3 is a detailed flowchart for the step illustrated in FIG. 2, in which whether an overcharge protection device is operating normally or has failed is determined.

The overcharge protection method including a diagnostic function according to an embodiment of the present invention, illustrated in FIG. 2, includes a step in which a control unit 102 detects the voltage VRAD between the two ends of a mechanical overcharge protection device 106 (S200) and a step in which the control unit 102 determines whether the mechanical overcharge protection device 106 is operating or has failed, based on the voltage VRAD detected between the two ends of the mechanical overcharge protection device 106 (S202).

As illustrated in FIG. 3, the step for determining whether the mechanical overcharge protection device 106 is operating or has failed (S202) includes steps S204, S206, S208, S210, S212, and S214.

First, at step S204, the control unit 102 determines whether the voltage VRAD between the two ends of the mechanical overcharge protection device 106 is 0 volts.

When the voltage VRAD between the two ends of the mechanical overcharge protection device 106 is 0 volts, the control unit 102 determines at step S206 that the mechanical overcharge protection device 106 normally detects the swelling of the battery 104 and the overcharge protection operation has been normally performed.

At step S208, the control unit 102 determines whether the voltage VRAD between the two ends of the mechanical overcharge protection device 106 is greater than 0 volts and less than a predetermined reference value, 3 volts.

When the voltage VRAD between the two ends of the mechanical overcharge protection device 106 is greater than 0 volts and less than 3 volts, the control unit 102 determines at step S210 that the mechanical overcharge protection device 106 is in a normal state and the overcharge protection operation has not been performed.

At step S212, the control unit 102 determines whether the voltage VRAD between both the two of the mechanical overcharge protection 106 is equal to or greater than the reference value, namely 3 volts.

When the voltage between the two ends of the mechanical overcharge protection device 106 is equal to or greater that 3 volts, the control unit 102 determines at step S214 that the mechanical overcharge protection device has defects or is in a failed state.

At step S214, in order to further ensure stability, the control unit 102 interrupts the supply of voltage B+ applied to the relay actuation coil L1 of the main relay MRL by controlling the operation of a relay actuation switch SW1, whereby the control unit may open the switch SW2 of the main relay MRL.

In an embodiment of the present invention, the predetermined reference value is 3 volts, but the reference value may be changed depending on the number of runaway arresting device switches RAD1, RAD2, and RAD3 that are used.

According to an embodiment of the present invention, because whether a mechanical overcharge protection device is operating or has failed may be accurately diagnosed, it is possible to detect in advance that the mechanical overcharge protection device may not be operating normally due to the defect or failure thereof. Therefore, fail safety concerning the overcharge protection device may be secured, thus improving safety.

Although the preferred embodiments of the present invention have been disclosed for illustrative purposes, those skilled in, the art will appreciate that various modifications, additions and substitutions are possible, without departing from the scope and spirit of the invention as disclosed in the accompanying claims.

What is claimed is:

1. An overcharge protection device including a diagnostic function, comprising:
   a mechanical overcharge protection device including at least one Runaway Arresting Device switch electrically connected between a relay actuation coil of a main relay and a ground,
   the at least one Runaway Arresting Device switch comprising a push button coupled to one side of a battery, and moving together in a direction of expansion according to an expansion of the battery, a travelling contact extended to the push button and moving in response to a physical movement of the push button, and a plurality of stationary contacts fixedly coupled to the at least one Runaway Arresting Device switch so as to be electrically connected or disconnected with the travelling contact within a movable range of the travelling contact;
   a control unit for diagnosing whether or not an overcharge protection operation of the mechanical overcharge protection device has been performed and whether the mechanical overcharge protection device is in a normal state or a failed state by detecting a voltage between two ends of the mechanical overcharge protection device; and
   a relay actuation switch connected to the relay actuation coil in series, for controlling an opening or shorting of a relay switch of the main relay by supplying or not supplying the voltage to the relay actuation coil by being shorted or opened according to a control signal of the control unit,
   wherein, when the degree of swelling of the battery is equal to or greater than a predetermined value, the push button moves the travelling contact in the direction of expansion of the battery to release the electrical connection between the travelling contact and the stationary contacts to release the connection between the relay actuation coil of the main relay and the ground, and
   wherein, when the control unit determines the mechanical overcharge protection device is in the failed state, the control unit opens the switch of the main relay by interrupting a supply of voltage applied to the relay actuation coil of the main relay by controlling the relay actuation switch to open.

2. The overcharge protection device of claim 1, wherein the control unit determines that an overcharge protection operation has been normally performed by the mechanical overcharge protection device when the voltage between the two ends of the mechanical overcharge protection device is 0 volts,
   determines that the mechanical overcharge protection device is in a normal state and has not operated when the voltage between the two ends of the mechanical overcharge protection device is greater than 0 volts and less than a reference value, and
   determines that the mechanical overcharge protection device has defects or is in a failed state when the voltage between the two ends of the mechanical overcharge protection device is equal to or greater than the reference value.

3. The overcharge protection device of claim 2, wherein the reference value is 3 volts.

4. An overcharge protection method including a diagnostic function, the method comprising:
   detecting a voltage between two ends of a mechanical overcharge protection device by a control unit;
   diagnosing by the control unit whether the mechanical overcharge protection device is operating or has failed, based on the detected voltage;
   opening, when the control unit determines the mechanical overcharge protection device has a defect or is in a failed state, a switch of a main relay by interrupting a supply of voltage applied to a relay actuation coil of the main relay by controlling a relay actuation switch to open,
   wherein the mechanical overcharge protection device includes at least one Runaway Arresting Device switch electrically connected between the relay actuation coil of the main relay and a ground, the at least one Runaway Arresting Device switch comprising a push button coupled to one side of the battery and moving together in a direction of expansion according to an expansion of the battery, a travelling contact extended to the push button and moving in response to a physical movement of the push button, and a plurality of stationary contacts fixedly coupled to the at least one Runaway Arresting Device switch so as to be electrically connected or disconnected with the travelling contact within a movable range of the travelling contact,
   wherein, when the degree of swelling of the battery is equal to or greater than a predetermined value, the push button moves the travelling contact in the direction of expansion of the battery to release the electrical connection between the travelling contact and the stationary contacts to release the connection between the relay actuation coil of a main relay and the ground, and
   wherein, the relay actuation switch is connected to the relay actuation coil in series for controlling an opening or shorting of a relay switch of the main relay by supplying or not supplying the voltage to the relay actuation coil by being shorted or opened according to a control signal of the control unit.

5. The overcharge protection method of claim 4, wherein diagnosing whether the mechanical overcharge protection device is operating or has failed comprises:
   determining that an overcharge protection operation has been normally performed by the mechanical overcharge protection device when the voltage between the two ends of the mechanical overcharge protection device is 0 volts;
   determining that the mechanical overcharge protection device is in a normal state and has not operated when the voltage between the two ends of the mechanical overcharge protection device is greater than 0 volts and less than a reference value; and
   determining that the mechanical overcharge protection device has defects or is in a failed state when the voltage between the two ends of the mechanical overcharge protection device is equal to or greater than the reference value.

6. The overcharge protection method of claim 5, wherein the reference value is 3 volts.

* * * * *